Patented Sept. 7, 1943

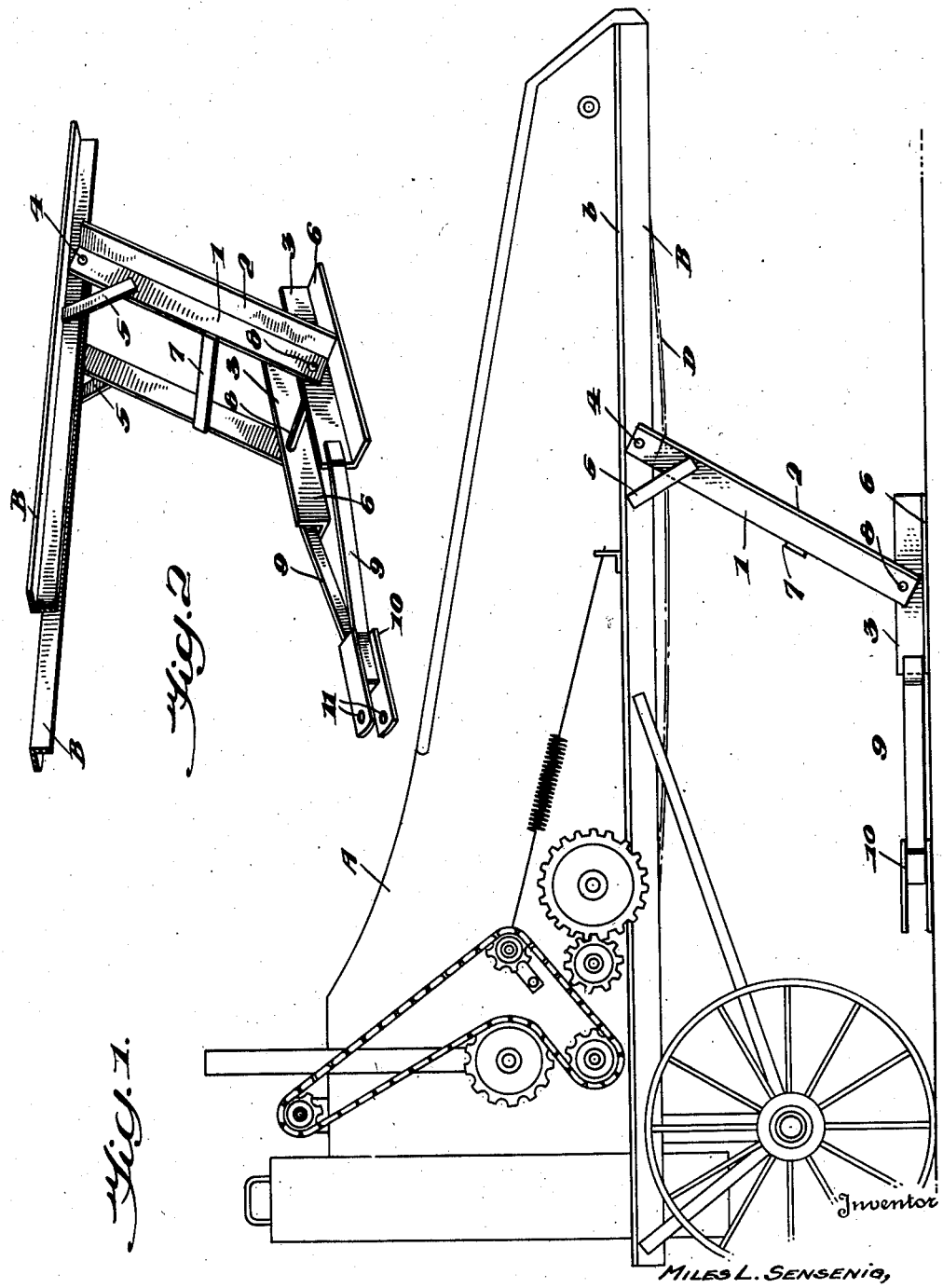

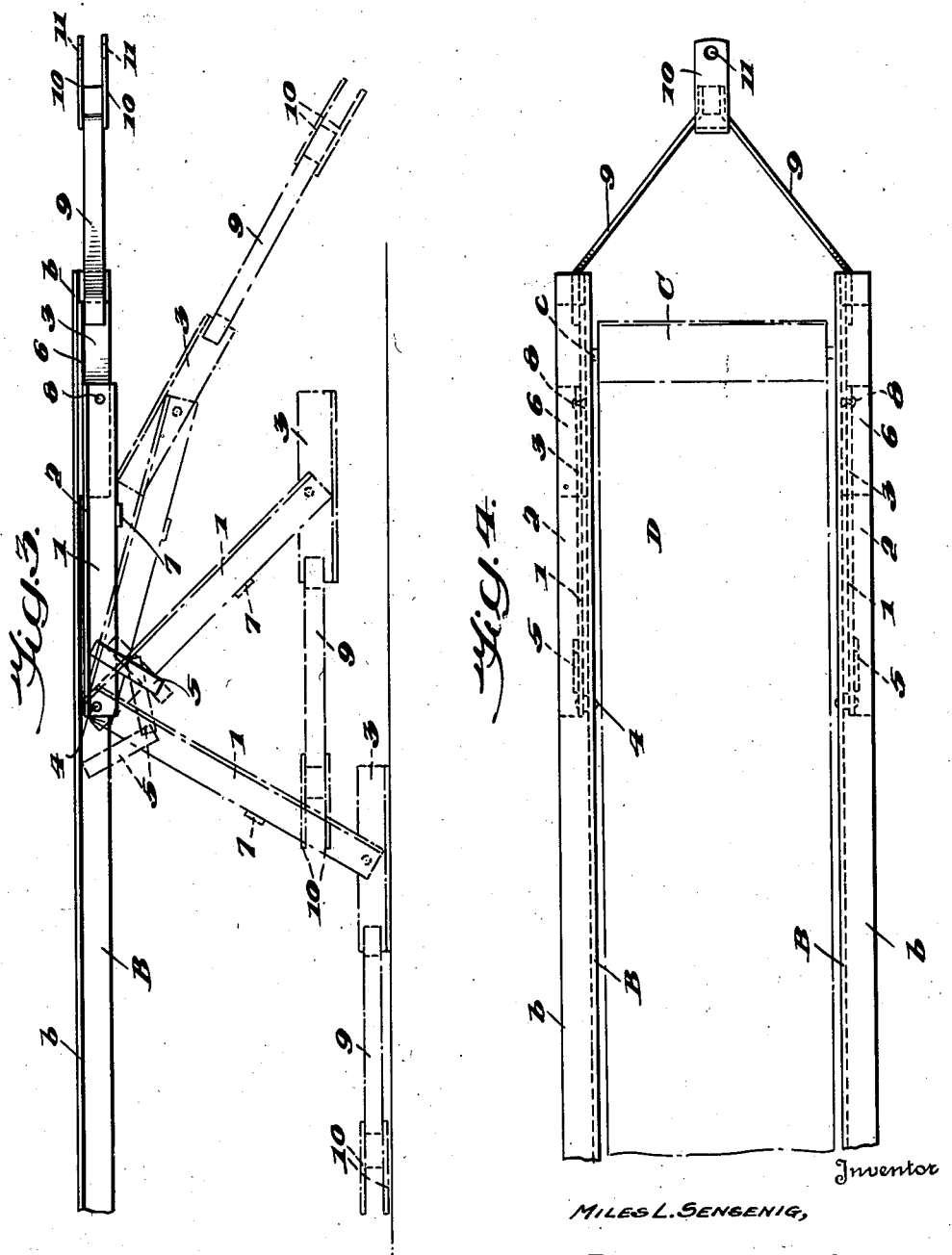

2,328,850

UNITED STATES PATENT OFFICE 2,328,850

TRAILER HITCH AND SUPPORT

Miles L. Sensenig, Lancaster, Pa., assignor to Dellinger Manufacturing Company, Lancaster, Pa., a corporation of Pennsylvania Application March 19, 1943, Serial No. 479,770

7 Claims. (Cl. 280—33.44)

This invention relates to a trailer hitch and support and the combination thereof with a conveyer equipped wheeled implement or agricultural apparatus, though it is capable of use in other fields employing conveyer equipped implements of various sorts. In connection with agricultural implements it finds its primary field of use in connection with ensilage cutters and similar implements which are to be drawn over close to the silo on a farm and there set up and operated while the loaded wagons are driven up close and their contents unloaded or forked to the moving table or traveling conveyer of the ensilage cutter or other implement. Heretofore it has been usual to mount the front end portion of such ensilage cutters and the like on a pair of wheels similar to those provided at the rear or cutter end and to provide a pair of shafts or tongue at the front and by which the implement might be drawn about by means of a horse or horses or a tractor, but this construction has resulted in the shaft or tongue and frequently the front wheels extending well beyond the front end of the moving table or conveyer and making it awkward or difficult, and oft-times impractical, to unload the wagons, either by forking or otherwise, directly onto the traveling table or conveyer because the wagons cannot get close enough to the front portion of the implement due to interference by the shafts or tongue or the front wheels.

The primary objects of the present invention are to entirely eliminate the front carriage of the implement, that is, the front wheels with their connecting axle and its fifth wheel and associated parts and the shafts or tongue connected with said axle; to eliminate the interference of the front wheels and the shafts or tongue when unloading the wagons bringing up the raw material, such as green stalks of corn to be cut into ensilage; to provide a hitch serving the dual functions, alternately, of a draw tongue for the implement while being pulled by said tongue or hitch from place to place as from the implement shed to the silo, or from one farm to another; or of a supporting jack or leg when the implement has arrived at the silo and has been set up for operation; to so form, construct, and combine the several parts of the hitch that in both of their operative relative positions they will properly support the front portion of said implement and resist the downward thrust of the weight of said implement; to so form and construct the hitch and so combine it with the implement that when the implement is set up for operation loaded wagons may be pulled directly across in front of the front portion of said implement and only spaced a few inches or a foot in front thereof so as to avoid actually hitting the front portion of the implement to the end that the wagons may be unloaded or forked out directly onto the moving table or conveyer of the implement with the greatest of ease and facility; to provide such a hitch which may be moved by one man alone from either position to the other position; and to so combine the hitch that it may be moved from either of its two operative positions into its other of said two operative positions and function in either of its two operative positions without interfering in any way with the operation of said implement or of its conveyer.

In the accompanying drawings:

Figure 1 represents a side elevation of an ensilage cutter with a hitch embodying my invention applied thereto, the said hitch being illustrated in its position wherein it functions as a jack or support for the front portion of the implement;

Figure 2, a perspective view of said hitch in the position shown in Fig. 1, the side bars of said implement being illustrated in fragmentary perspective view;

Figure 3, a side elevation of the side bars, broken away, of said implement and of the said hitch connected thereto, said hitch being illustrated in solid lines in the position it occupies when functioning as a draw-bar or hitch and being illustrated in dotted and dash lines in the position illustrated in Figure 1 and also into two progressively intermediate positions; and Figure 4, a top plan view of the side bars of the implement and of the hitch when in the solid line position illustrated in Figure 3, the front portion of the conveyer, broken away, being shown in top plan between the front portions of said bars and extending about the front conveyer supporting or tensioning roller which is shown in dotted lines.

Referring now in detail to the drawings A designates an ensilage cutter or other implement or apparatus having side bars formed with vertical webs B having substantially perpendicular flanges b. An endless band conveyer D may be disposed in said implement between said side bars and travel over or about roller C mounted on a shaft c journaled in suitable bearings in the front portion of the respective side bars and may be driven by any usual and suitable means not illustrated in detail nor described in detail herein inasmuch as they form no part of my present invention and may be of any conventional construction and operation.

The hitch consists of a pair of preferably L-angle iron or steel sections having vertical webs 1 and perpendicularly disposed webs 2, a similar pair of similar but preferably shorter angle iron or steel sections having vertical webs 3 and horizontal webs 6 perpendicular to webs 3, a strap metal yoke 9 which may be of V shape and which preferably includes or comprises a pair of clevis plates 10 welded preferably to the acute angle portion of the V and formed with registering holes 11 to receive the usual connecting or clevis pin or bolt, not shown.

Pivot pins 4 passing through the rear or upper end portions of the vertical webs 1 serve to secure the first mentioned pair of angle irons, which may well be termed leg or shank bars or rods, to the side bars respectively of the implement for vertical swinging motion relative thereto with the inner faces of the respective leg or shank bars or rods adjacent to and practically parallel to, but slightly spaced from, the vertical outer faces of the respective vertical webs B of said side bars and with horizontal flanges 2 in similar relation to the respective horizontal flanges b of said side bars.

In turn pivot pin 8 passing through the forward end portions of the vertical webs 1 of said leg or shank irons and the medial portions of the vertical webs 3 of the shorter angle irons which may well be referred to as knee irons respective serve to pivotally connect the respective shank or leg irons to the respective knee irons with the vertical web 3 of the knee irons interposed in part between the forward ends of the respective leg or shank irons and the outer faces of the vertical webs B of the respective side bars and in, or practically in, rubbing contact therewith, and with the respective horizontal webs 6, or the webs 6 perpendicular to the webs 3, of said knee irons having their rear portions interposed between the upper faces of the respective horizontal flanges 2 of the shank irons and the lower faces of the horizontal flanges b of the respective side bars of the implement and in supporting contact with the under face of said horizontal flanges b of said respective side bars.

The rear or otherwise open end of the V yoke 9 has the free end portions of the arms of the V secured to the front portions of the knee irons, preferably by having the respective free ends of said yoke welded to the outer faces of the front portions of the vertical webs 3 of the respective knee irons.

The yoke 9 may be constructed of two legs of strap metal having their rear free end portions secured, as by welding, to the outer faces of the vertical webs 3 of the respective knee irons and having their front end portions preferably arranged in spaced relation in contact with the opposed faces of a spacer block which in turn, together with said forward ends, is disposed between the clevis plates 10, said plates 10, spacer block and forward end portions all being welded together by a single welding operation.

It will be seen from Figures 3 and 4 and the foregoing description that the composite hitch may flex or fold downward from its horizontal solid line position illustrated in Fig. 3, but that it cannot move upward relative to the side bars of the implement beyond such horizontal position and that it will support and carry the weight of the forward end of the implement during the dragging of the latter from point to point.

Braces 5 respectively are welded to the upper or rear portions of the vertical webs 1 of the shank or leg irons at acute angles of approximately forty-five degrees relative to the edges of the respective webs 1 above or to the rear of said braces 5 and are of such length and so located on said webs 1 respectively that when said shank irons are swung about the common axes of the pivot pins 4 beyond a vertical position to a vertically inclined, near vertical, position, the then upper free ends of said braces 5 will contact the lower faces of the respective horizontal webs b of the respective side bars of the implement, whereby further swinging movement in that direction will be prevented, and, the shank irons having swung beyond true vertical or dead center, the weight of the forward end of the implement on the pivot pins 4 will prevent reverse swinging movement, thus the knee irons will be positioned in a definite location relative to the pivot pins 4 and will afford a large area supporting pad bearing on the ground and supporting the weight of the forward end of the implement and being free to swing slightly about the axis of its pivot pin or rod 8 to accommodate itself to possible inequalities or incline of the ground surface upon which it may rest.

Preferably a tie strap or bar 7 will have its end portions welded to the medial portions of the edges of the webs 1 of the respective leg or shank irons to prevent the possible bending or spreading of said shank irons or to strengthen them to help resist possible bending or spreading tendencies.

I claim:

1. For use with a vehicle having a frame including metal side bars formed with laterally outwardly presented flanges extending at an abrupt angle from the upper portions of said side bars respectively, a trailer-hitch and support comprising a pair of shank irons to be pivotally connected through their respective rear portions to the said respective side bars, a pair of knee irons respectively pivotally connected at their medial portions to the front portions of said respective shank irons and disposed between the latter and said vehicle frame, a yoke having arms respectively connected to the forward portions of said respective knee irons, said respective knee irons being overlapped on said respective shank irons and respectively formed with laterally outwardly extending flanges interposed between said respective shank irons and said side bar flanges and engaging the latter in the trailer-hitch operative position of the parts, and braces respectively secured to the respective shank irons to engage said lateral flanges respectively of the respective side bars to prevent rearward swinging movement of said shank irons beyond a predetermined point past the true vertical, said knee irons being swingable on their pivotal connections to said shank irons to present their laterally outwardly extending flanges downwardly to constitute a relatively large area supporting knee to, together with said shank irons, support the front portion of said vehicle when the same is stationary and disconnected from draft means.

2. A vehicle having a frame including metal side bars formed with laterally outwardly presented flanges extending at an abrupt angle from the upper portions of said side bars respectively and provided with an endless band conveyer belt operating lengthwise of and between said side bars, in combination with a trailer-hitch and support comprising a pair of shank irons pivotally connected through their respective rear portions to the said respective side bars and so spaced as to accommodate between them the return flight of said conveyer belt, a pair of knee irons respectively pivotally connected at their medial portions to the front portions of said respective shank irons and disposed between the latter and said vehicle frame, a yoke having arms respectively connected to the forward portions of said respective knee irons, said respective knee irons being overlapped on said respective shank irons and respectively formed with laterally outwardly extending flanges interposed between said respective shank irons and said side bar flanges and engaging the latter in the trailer-hitch operative position of the parts, and braces respectively secured to the respective shank irons to engage said lateral flanges respectively of the respective side bars to prevent rearward swinging movement of said shank irons beyond a predetermined point past the true vertical, said knee irons being swingable on their pivotal connections to said shank irons to present their laterally outwardly extending flanges downwardly to constitute a relatively large area supporting knee to together with said shank irons support the front portion of said vehicle when the same is stationary and disconnected from draft means.

3. A trailer-hitch and support comprising a pair of shank irons to be pivotally connected through their respective rear portions to the respective side bars of a vehicle, a pair of knee irons respectively pivotally connected at their medial portions to the front portions of said respective shank irons, a yoke having arms respectively connected to the forward portions of said respective knee irons, said respective knee irons being respectively formed with laterally outwardly extending flanges, and braces respectively secured to the respective shank irons to engage portions of the respective side bars of said vehicle to prevent rearward swinging movement of said shank irons beyond a predetermined point past the true vertical, said knee irons being swingable on their pivotal connections to said shank irons to present their laterally outwardly extending flanges downwardly to constitute a relatively large area supporting knee to together with said shank irons support the front portion of said vehicle when the same is stationary and disconnected from draft means.

4. A trailer-hitch and support comprising a pair of shank irons to be pivotally connected through their respective rear portions to the respective side bars of a vehicle, a pair of knee irons respectively pivotally connected at their medial portions to the front portions of said respective shank irons, a yoke having arms respectively connected to the forward portions of said respective knee irons, and stop means respectively secured to the respective shank irons to prevent rearward swinging movement of said shank irons beyond a predetermined point past the true vertical, said knee irons being swingable on their pivotal connections to said shank irons to lie substantially parallel to and in contact with a supporting surface.

5. A trailer-hitch and support comprising a pair of angle-iron shank irons to be pivotally connected by their respective rear portions to the respective side bars of a vehicle frame, a pair of angle iron knee irons respectively pivotally connected at their medial portions to the front portions of said respective shank irons, a yoke having arms respectively connected to the forward portions of said respective knee irons, brace means permanently connecting said shank irons and holding them in proper spaced relation to each other, and stop means respectively secured to the respective shank irons to prevent rearward swinging movement of said shank irons beyond a predetermined point past the true vertical.

6. A trailer-hitch and support comprising a pair of angle-iron shank irons to be pivotally connected by their respective rear portions to the supporting bars of a vehicle frame, a pair of angle iron knee irons respectively pivotally connected at their medial portions to the front portions of said respective shank irons, a yoke having arms respectively connected to the forward portions of said respective knee irons, and stop means respectively secured to the respective shank irons to prevent rearward swinging movement of said shank irons beyond a predetermined point past the true vertical.

7. A trailer-hitch and support comprising a pair of shank members to be pivotally connected by their respective rear portions to rigid members of a vehicle frame, a pair of knee members respectively pivotally connected at their medial portions to the front portions of said shank members, a yoke having arms respectively connected to the forward portions of said respective knee members, and stop means to be interposed between one of said rigid members and one of said shank members to cooperate therewith to stop swinging movement of said shank member at a predetermined point relative to said rigid member.

MILES L. SENSENIG.